US010052804B2

(12) United States Patent
Schad et al.

(10) Patent No.: US 10,052,804 B2
(45) Date of Patent: Aug. 21, 2018

(54) COOLING PLATE ASSEMBLY FOR AN INJECTION MOLDING MACHINE

(71) Applicant: Athena Automation Ltd., Vaughan (CA)

(72) Inventors: Robert D. Schad, Toronto (CA); Roberto Sicilia, Mississauga (CA)

(73) Assignee: ATHENA AUTOMATION LTD., Vaughan (CA)

( * ) Notice: Subject to any disclaimer, the term of this patent is extended or adjusted under 35 U.S.C. 154(b) by 342 days.

(21) Appl. No.: 15/073,974

(22) Filed: Mar. 18, 2016

(65) Prior Publication Data

US 2016/0271850 A1    Sep. 22, 2016

Related U.S. Application Data

(60) Provisional application No. 62/136,212, filed on Mar. 20, 2015.

(51) Int. Cl.
*B29C 45/73*    (2006.01)
*B29C 45/72*    (2006.01)
*B29K 105/00*   (2006.01)

(52) U.S. Cl.
CPC ...... *B29C 45/7312* (2013.01); *B29C 45/7207* (2013.01); *B29C 2045/725* (2013.01); *B29C 2045/7214* (2013.01); *B29K 2105/258* (2013.01)

(58) Field of Classification Search
CPC ...... B29C 2045/7214; B29C 2045/725; B29C 45/7207; B29C 45/7312; B29C 45/7331
See application file for complete search history.

(56) References Cited

U.S. PATENT DOCUMENTS

| | | | |
|---|---|---|---|
| 5,725,891 A | 3/1998 | Reid, Jr. | |
| 7,306,452 B2 | 12/2007 | Lausenhammer et al. | |
| 7,326,046 B2* | 2/2008 | Neter | B29C 45/7207 264/237 |
| 7,517,213 B2 | 4/2009 | Lausenhammer et al. | |
| 2004/0056385 A1* | 3/2004 | Neter | B29C 45/0053 264/328.14 |
| 2007/0264385 A1* | 11/2007 | McCready | B29C 45/42 425/547 |
| 2008/0256789 A1* | 10/2008 | Fisch | B29C 45/42 29/705 |

FOREIGN PATENT DOCUMENTS

DE    4000766 A1    7/1991

* cited by examiner

*Primary Examiner* — Jill L Heitbrink
(74) *Attorney, Agent, or Firm* — Bereskin & Parr LLP/S.E.N.C.R.L., s.r.l.

(57) ABSTRACT

A cooling plate assembly for an injection molding machine includes a cooling plate and a cooling fluid conduit system in the cooling plate. The cooling fluid conduit system includes a cooling fluid line extending between a cooling fluid inlet and a cooling fluid outlet. A socket is open to a front face of the cooling plate and intersects the first cooling fluid line. A cooling tube is mounted to the cooling plate, and includes a molded-article-receiving nest for receiving and cooling an injection molded article, a spigot received in the socket and blocking the first cooling fluid line, and a cooling tube conduit adjacent the molded-article-receiving nest. The cooling tube conduit extends between a cooling tube fluid inlet connected to the first cooling fluid line upstream of the socket, and a cooling tube fluid outlet connected to the first cooling fluid line downstream of the socket.

20 Claims, 12 Drawing Sheets

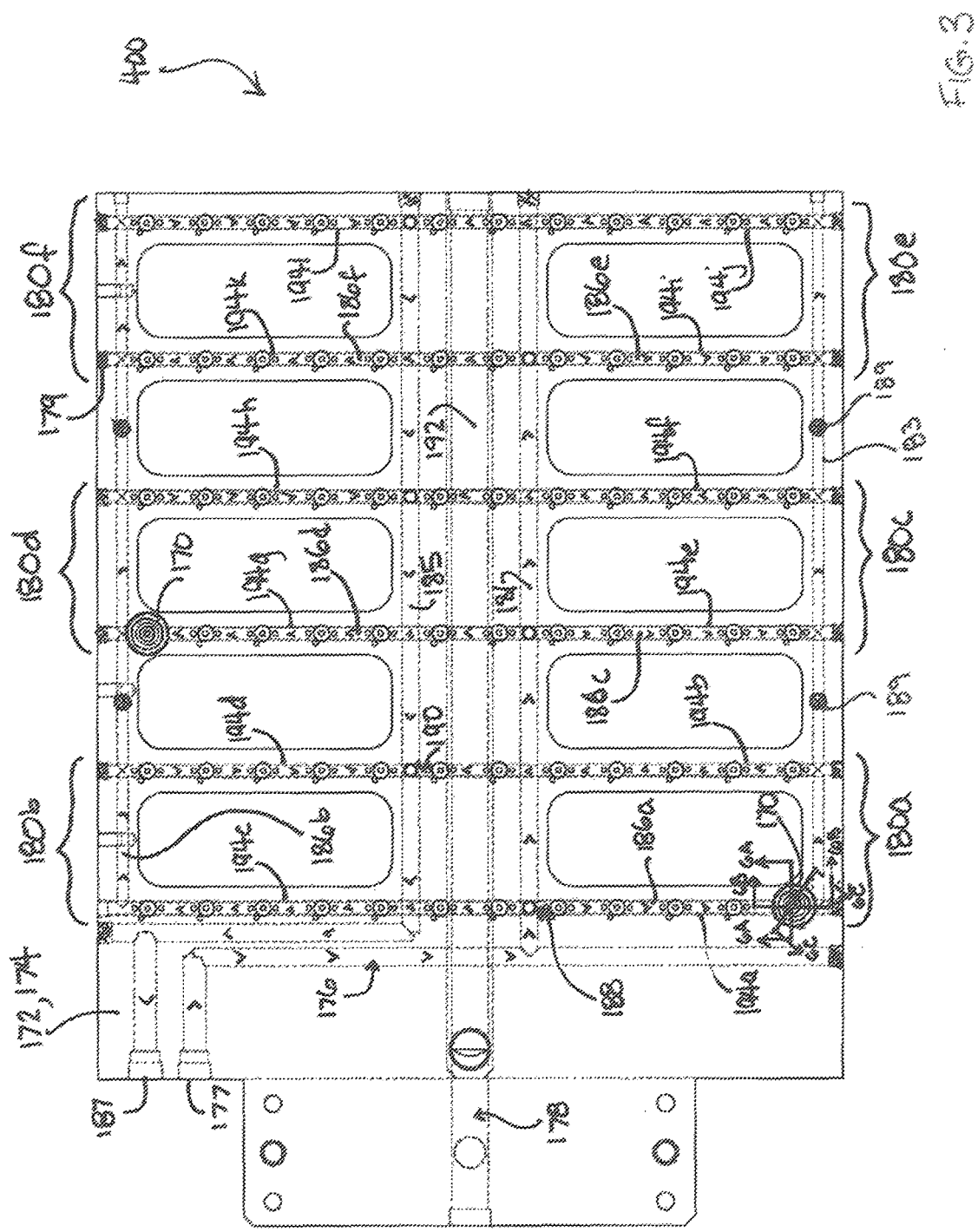

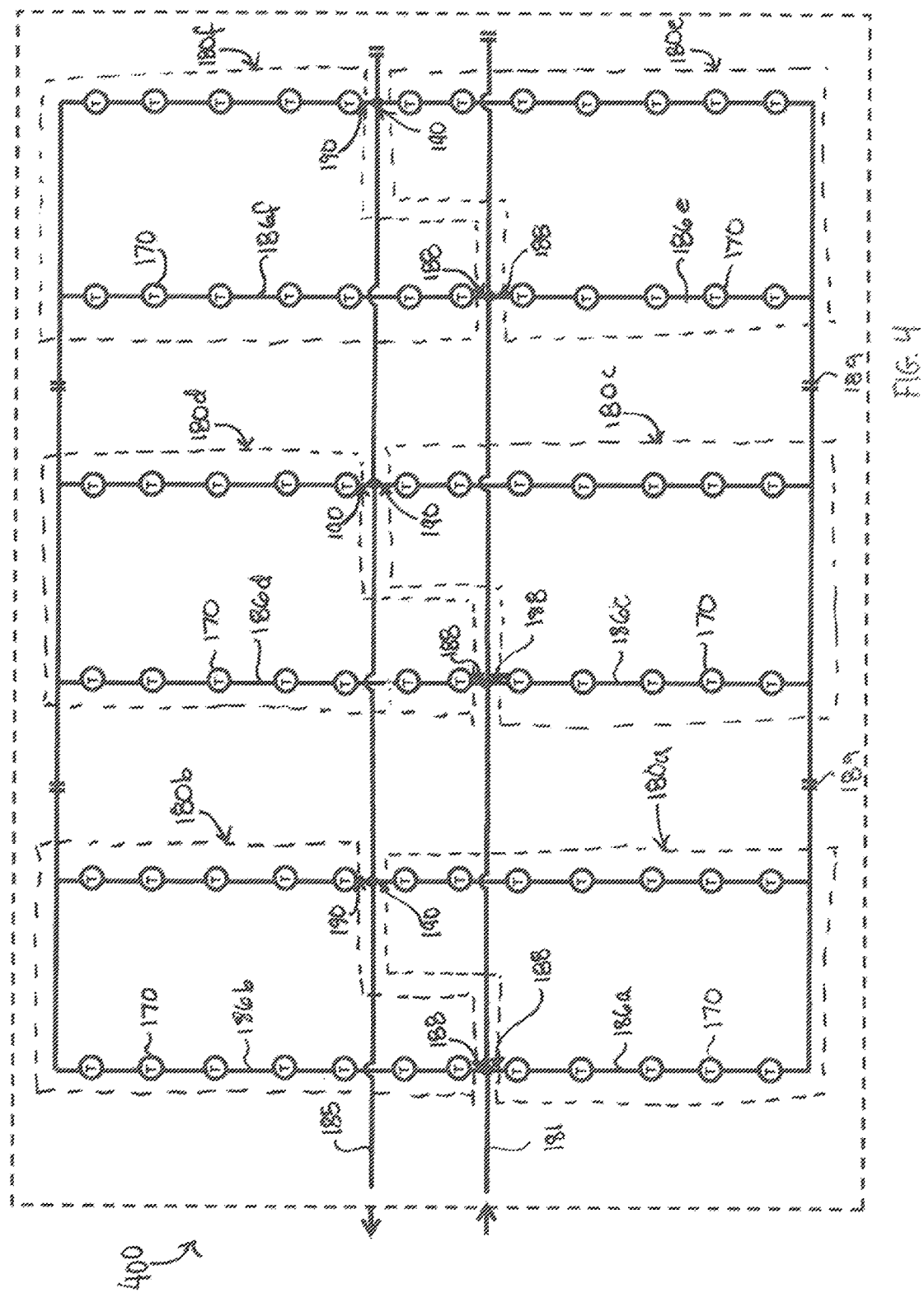

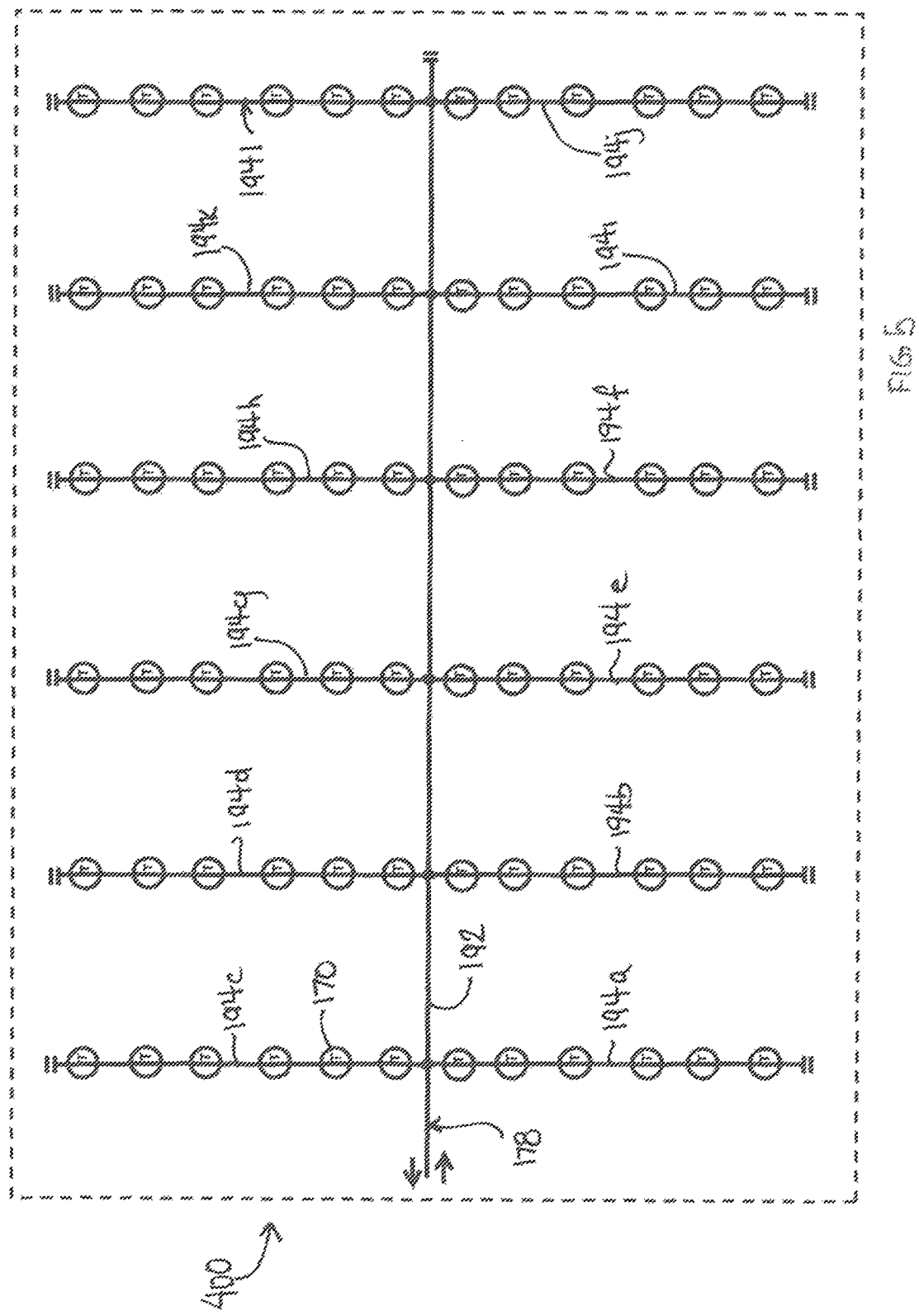

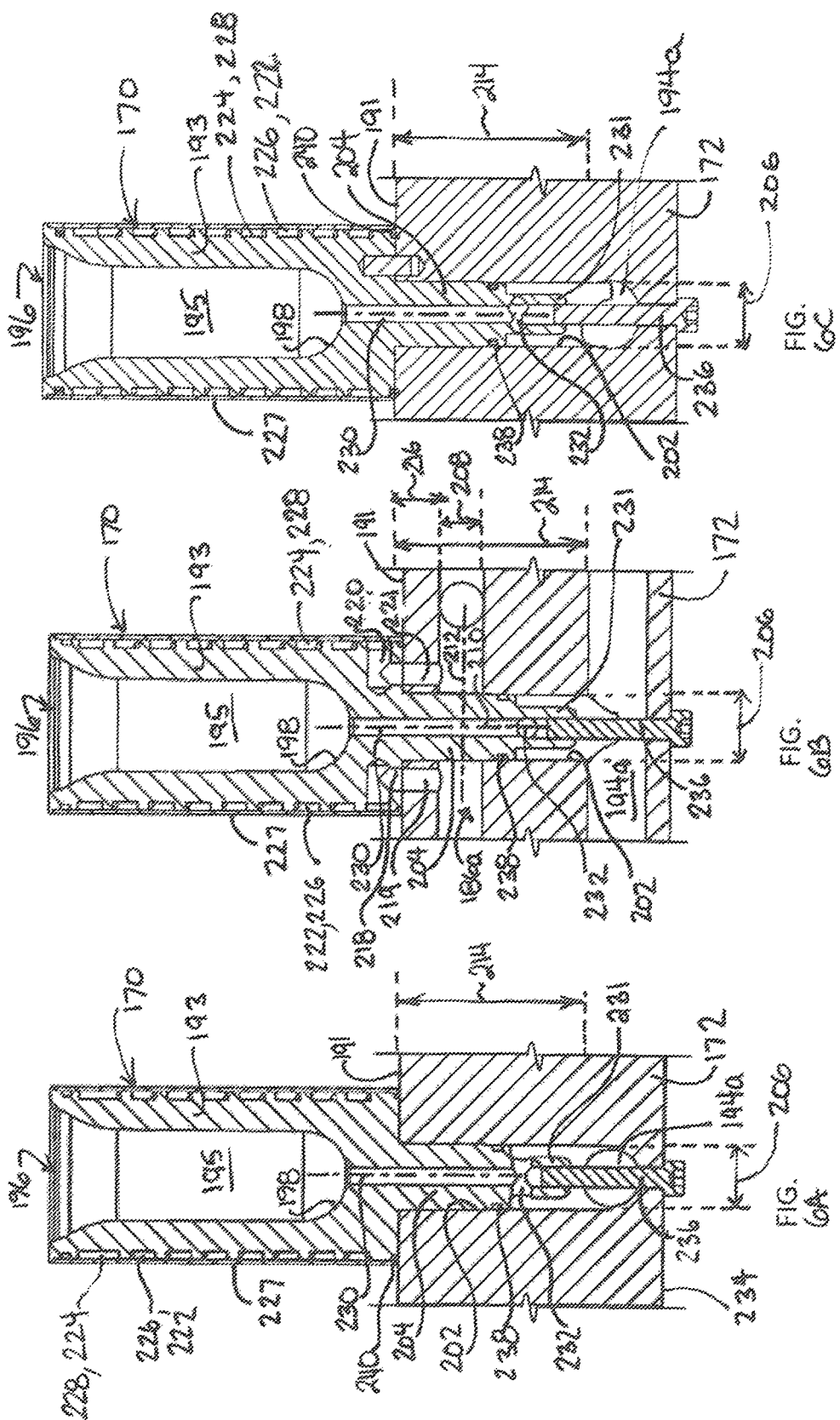

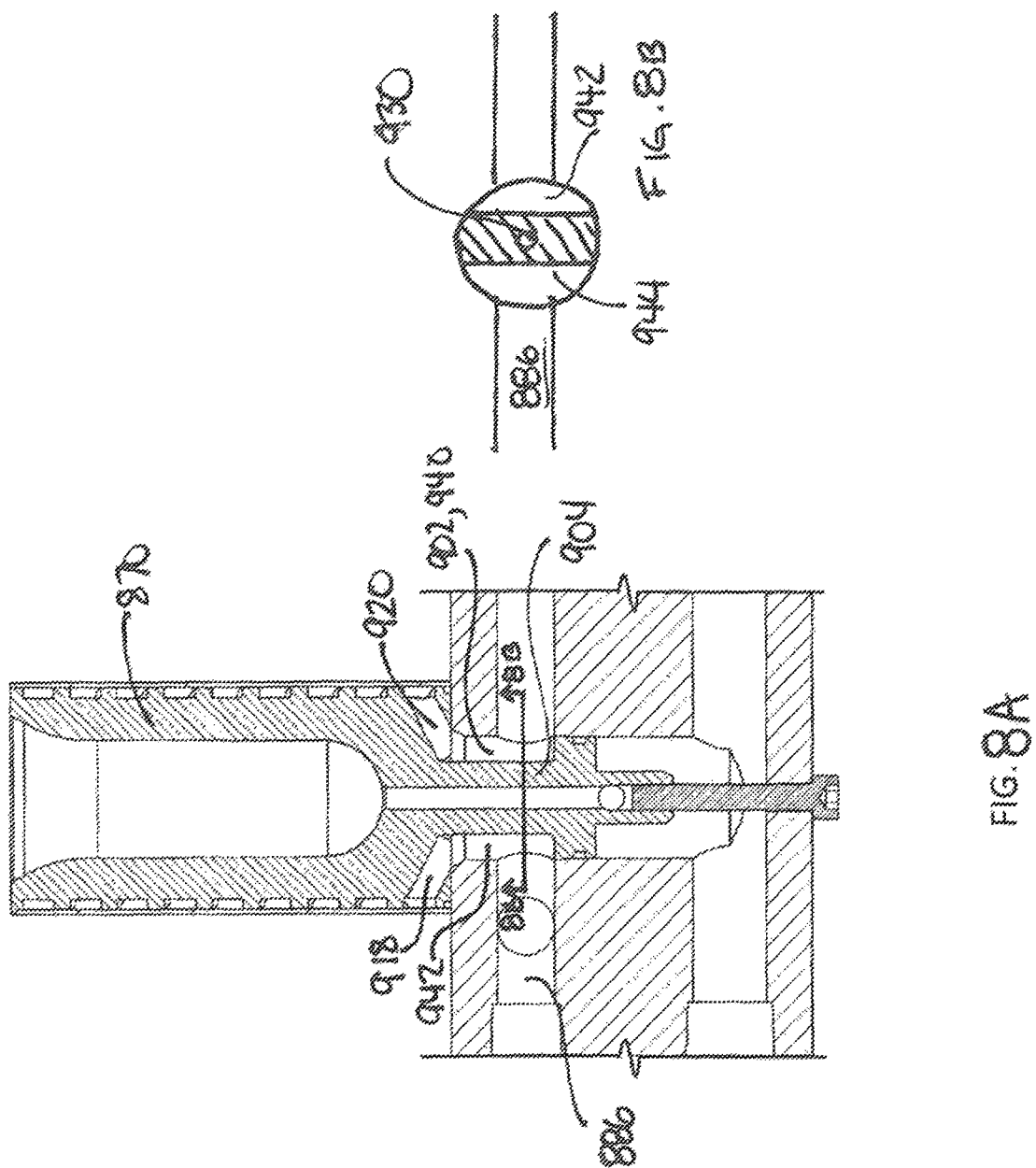

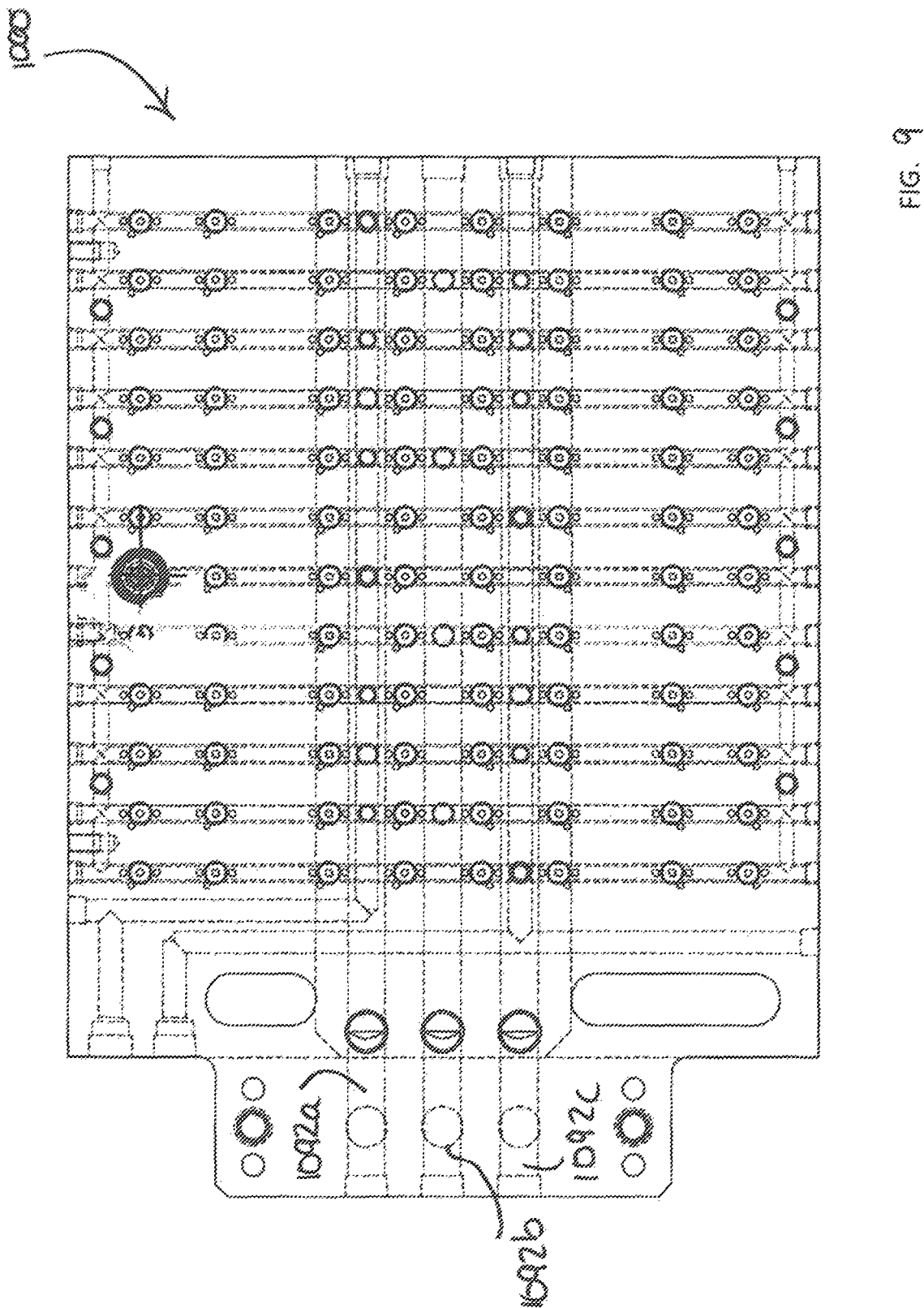

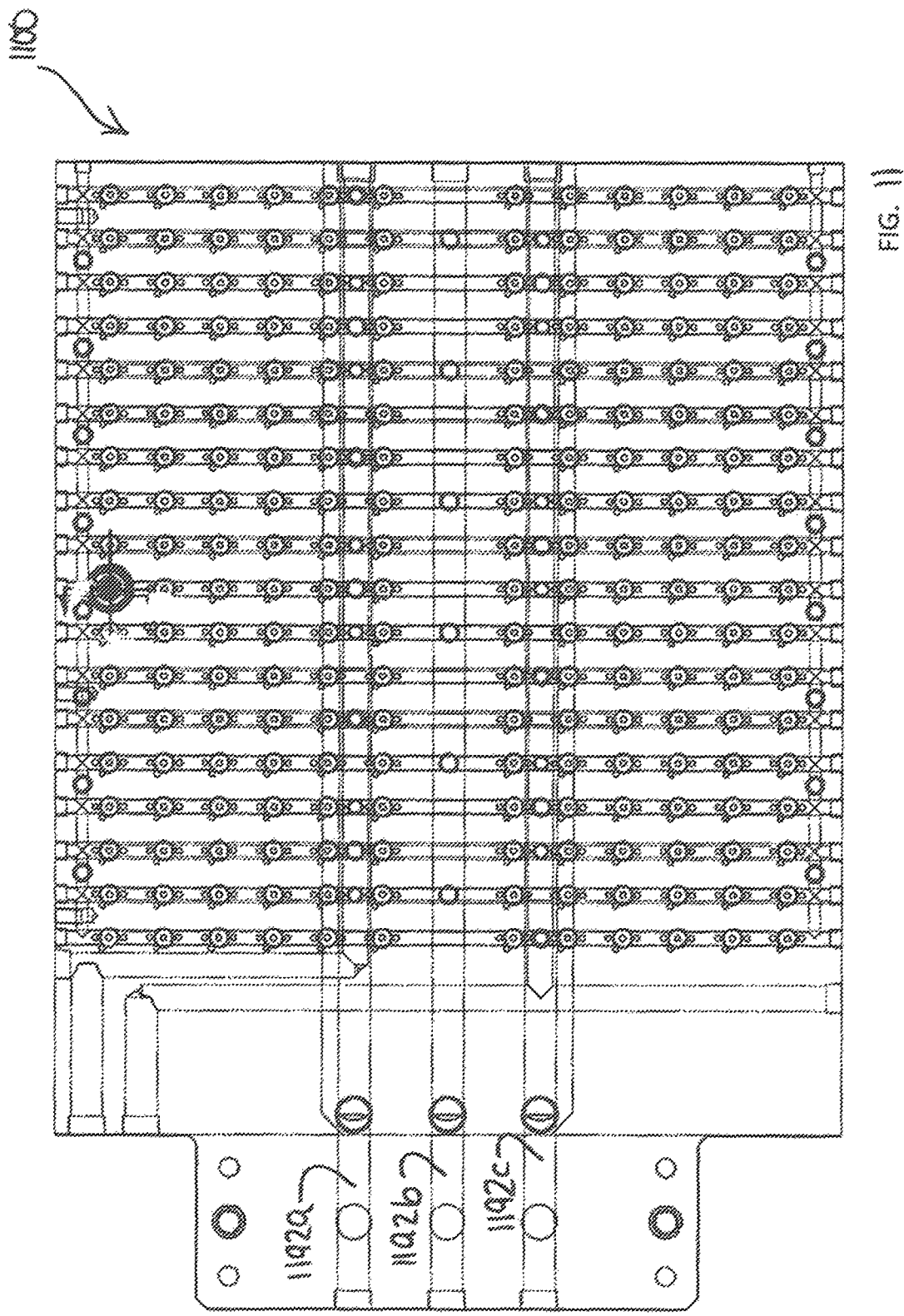

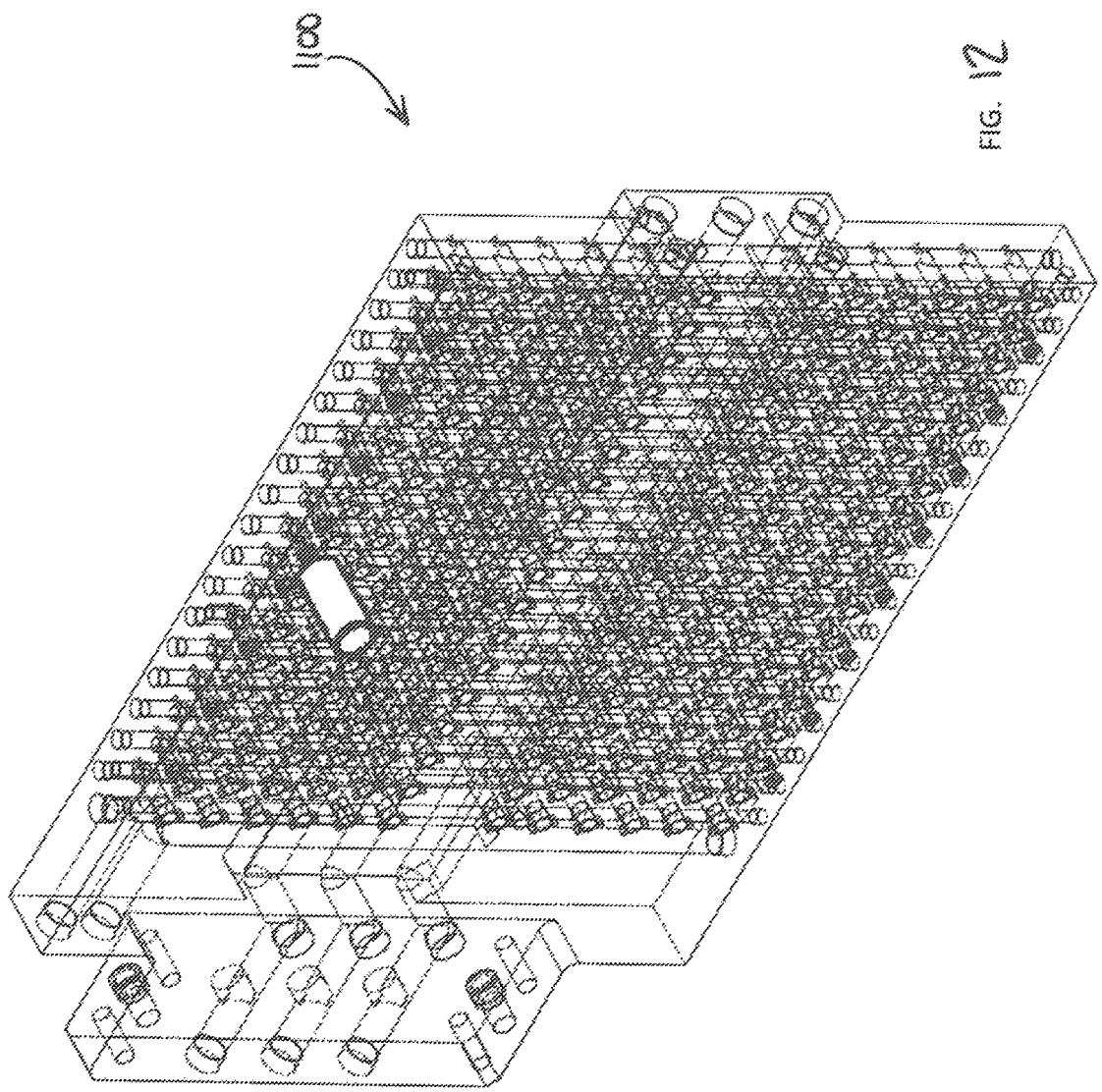

COOLING PLATE ASSEMBLY FOR AN INJECTION MOLDING MACHINE

CROSS-REFERENCE TO RELATED APPLICATIONS

This application claims the benefit of U.S. Provisional Application No. 62/136,212, entitled "COOLING PLATE ASSEMBLY FOR AN INJECTION MOLDING MACHINE", filed Mar. 20, 2015, the entire contents of which are hereby incorporated by reference.

FIELD

The disclosure relates to injection molding machines, and methods and apparatuses for post-mold cooling of injection molded articles.

BACKGROUND

U.S. Pat. No. 7,306,452 (Lausenhammer et al.) purports to disclose a cooling system for cooling sleeves fixed to a carrier plate. A fluid is passed from a fluid inlet to a fluid outlet by way of fluid conduits supported by means of the carrier plate. The fluid conduits include main supply conduits and supply conduits which extend approximately transversely with respect to each other. The supply conduits extend in a mutually parallel relationship and are arranged in pairs in the carrier plate and are connected to a row of sleeves by way of intake and discharge conduits. The row of sleeves is so disposed between the supply conduits of a pair such that each sleeve is connected to both supply conduits, and fluid communication is interrupted in at least the one supply conduit of the pair substantially at the middle of its longitudinal extent.

U.S. Pat. No. 7,517,213 (Lausenhammer et al.) purports to disclose a cooling system for cooling tool parts. The system includes at least one base system including a fluid guided from a fluid inlet through connector lines to a fluid outlet. The tool parts are connected in the direction of through-flow between at least one connector line connected to the fluid inlet and at least one connected to the fluid outlet, wherein, between the at least one connector line connected to the fluid inlet and the at least one connector line connected to the fluid outlet, at least one additional connector line and tool parts which are in flow communication therewith are placed in between such that, on its flow path, the fluid flows through at least two tool parts one after the other.

SUMMARY

The following summary is intended to introduce the reader to various aspects of the applicant's teaching, but not to define any invention. In general, disclosed herein are one or more methods or apparatuses related to injection molding, and to cooling injection molded articles outside the mold area of an injection molding machine.

According to some aspects, a cooling plate assembly for an injection molding machine comprises a cooling plate and a cooling fluid conduit system in the cooling plate. The cooling fluid conduit system comprises a supply header, an evacuation header, and first and second cooling fluid lines. Each cooling fluid line has an inlet end connected to the supply header and an outlet end connected to the evacuation header. The cooling plate assembly further comprises a plurality of cooling tubes mounted to the cooling plate for receiving and cooling a plurality of injection molded articles. The cooling tubes are arranged in at least a first group of first cooling tubes and a second group of second cooling tubes. The first cooling tubes are connected to the first cooling fluid line in series, and the second cooling tubes are connected to the second cooling fluid line in series.

The cooling plate may comprise a plurality of sockets, and the cooling tubes may each comprise a spigot received in a respective one of the sockets. The sockets may be arranged in at least a first group of first sockets and a second group of second sockets. Each spigot of the first cooling tubes may be received in a respective one of the first sockets, and each spigot of the second cooling tubes may be received in a respective one of the second sockets. The first sockets may be in fluid communication with the first cooling fluid line, and the second sockets may be in fluid communication with the second cooling fluid line.

Each cooling tube may comprise a cooling tube fluid inlet connected to the cooling fluid conduit system and a cooling tube fluid outlet connected to the cooling fluid conduit system. Each spigot of the first cooling tubes may block the first cooling fluid line. Each cooling tube fluid inlet of the first cooling tubes may be connected to the first cooling fluid line upstream of the respective one of the first sockets, and each cooling tube fluid outlet of the first cooling tubes may be connected to the first cooling fluid line downstream of the respective one of the first sockets. Each spigot of the second cooling tubes may block the second cooling fluid line. Each cooling tube fluid inlet of the second cooling tubes may be connected to the second cooling fluid line upstream of the respective one of the second sockets, and each cooling tube fluid outlet of the second cooling tubes may be connected to the second cooling fluid line downstream of the respective one of the second sockets.

The assembly may further comprise an air conduit system in the cooling plate. Each socket may provide a flow passage between the cooling fluid conduit system and the air conduit system. Each spigot may block a respective one of the flow passages to impede fluid flow between the air conduit system and the cooling fluid conduit system. Each spigot may comprise at least one bore extending therethrough and providing fluid communication between the air conduit system and a nest of a respective one of the cooling tubes.

The cooling plate may have a thickness, and the air conduit system may comprise at least a first air line. The first cooling fluid line and the first air line may be stacked and overlie each other in a direction parallel to the thickness.

According to some aspects, a cooling plate assembly for an injection molding machine comprises a cooling plate. The cooling plate comprises at least a first socket. The cooling plate assembly further comprises a cooling fluid conduit system in the cooling plate. The cooling fluid conduit system comprises a cooling fluid inlet, a cooling fluid outlet, and at least a first cooling fluid line in fluid communication with the cooling fluid inlet, the cooling fluid outlet, and the first socket. At least a first cooling tube is mounted to the cooling plate for receiving and cooling an injection molded article. The first cooling tube comprises a spigot received in the first socket and blocking the first cooling fluid line, a cooling tube fluid inlet connected to the first cooling fluid line upstream of the first socket, and a cooling tube fluid outlet connected to the first cooling fluid line downstream of the first socket.

The assembly may further comprise a second cooling tube mounted to the cooling plate. The first cooling tube and the second cooling tube may be connected to the first cooling fluid line in series.

The assembly may further comprise an air conduit system in the cooling plate. The first socket may provide a flow passage between the cooling fluid conduit system and the air conduit system. The spigot may block the flow passage to impede fluid flow between the air conduit system and the cooling fluid conduit system.

The spigot may comprise at least one bore extending therethrough and providing fluid communication between the air conduit system and a nest of the first cooling tube.

The cooling plate may have a thickness and the air conduit system may comprise at least a first air conduit line. The first cooling fluid line and first air conduit line may be stacked and overlie each other in a direction parallel to the thickness.

According to some aspects, a cooling plate assembly for an injection molding machine comprises a cooling plate. The cooling plate comprises a cooling fluid conduit system, an air conduit system, and at least a first socket providing a flow passage between the cooling fluid conduit system and the air conduit system. At least a first cooling tube is mounted to the cooling plate for receiving and cooling an injection molded article. The first cooling tube comprises a spigot received in the first socket and blocking the flow passage to impede fluid flow between the air conduit system and the cooling fluid conduit system, an internal cooling tube conduit in fluid communication with the cooling fluid conduit system, and a nest in fluid communication with the air conduit system.

The cooling tube conduit may extend between a cooling tube fluid inlet connected to the cooling fluid conduit system upstream of the first socket, and a cooling tube fluid outlet connected to the cooling fluid conduit system downstream of the first socket.

The spigot may comprise at least one bore extending therethrough and providing fluid communication between the air conduit system and the nest of the first cooling tube.

The cooling plate may have a thickness. The air conduit system may comprise at least a first air conduit line. The cooling fluid conduit system may comprise at least a first cooling fluid line. The first cooling fluid line and first air conduit line may be stacked and overlie each other in a direction parallel to the thickness.

The cooling plate may further comprise a second cooling tube mounted to the cooling plate. The first cooling tube and the second cooling tube may be connected to the first cooling fluid line in series.

According to some aspects, a cooling plate for an injection molding machine comprises a plate body for supporting a plurality of cooling tubes. A cooling fluid conduit system is in the plate body for cooling the cooling tubes. An air conduit system is in the plate body for providing air flow communication with respective nests of the cooling tubes. A plurality of sockets are provided in the plate body for receiving respective spigots of the cooling tubes. Each socket provides a flow passage between the cooling fluid conduit system and the air conduit system. The flow passage is blockable by the spigot to impede fluid flow between the cooling fluid conduit system and the air conduit system.

The cooling fluid conduit system may comprise at least a first cooling fluid line, and the air conduit system may comprise at least a first air line. The flow passages may be provided between the first air line and the first fluid line.

The plate body may have a thickness, and the first cooling fluid line and first air line may be stacked and overlie each other in a direction parallel to the thickness.

The plate body may comprise a front face, and the first cooling fluid line may be between the first air line and the front face. Each of the sockets may extend from the front face through the first cooling fluid line and to the first air line.

Each socket may have a socket diameter and a socket centerline extending generally perpendicular to the front face. The first cooling fluid line may have a first cooling fluid line diameter and a first cooling fluid line centerline extending generally parallel to the front face. The socket diameter may be greater than the first cooling fluid line diameter. The socket centerline and the first cooling fluid line centerline may intersect.

Each socket may have a socket depth between the front face and a juncture of the socket and the first air line. The first cooling fluid line may be spaced from the front face by a first cooling fluid line spacing. The socket depth may be greater than a sum of the first cooling fluid line diameter and the first cooling fluid line spacing.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the teaching of the present specification and are not intended to limit the scope of what is taught in any way. In the drawings:

FIG. 3 is a front view of an example cooling plate assembly for an injection molding machine like that of FIG. 1;

FIG. 4 is a schematic view of cooling fluid lines of the cooling plate assembly of FIG. 3;

FIG. 5 is a schematic view of air lines of the cooling plate assembly of FIG. 3;

FIG. 6A is a cross-sectional view of a portion of the cooling plate assembly of FIG. 3 taken along line 6A-6A in FIG. 3;

FIG. 6B is a cross-sectional view of a portion of the cooling plate assembly of FIG. 3 taken along line 6B-6B in FIG. 3;

FIG. 6C is a cross-sectional view of a portion of the cooling plate assembly of FIG. 3 taken along line 6C-6C in FIG. 3;

FIG. 8A is a cross-sectional view of a portion of an alternative cooling plate assembly for an injection molding machine like that of FIG. 1;

FIG. 8B is a cross-sectional view of the portion of the cooling plate assembly of FIG. 8A taken along line 8B-8B in FIG. 8A;

FIG. 10 is a perspective view of the cooling plate assembly of FIG. 9;

FIG. 11 is a front view of an alternative cooling plate assembly for an injection molding machine like that of FIG. 1; and FIG. 12 is a perspective view of the cooling plate assembly of FIG. 11.

DETAILED DESCRIPTION

Figure 1:
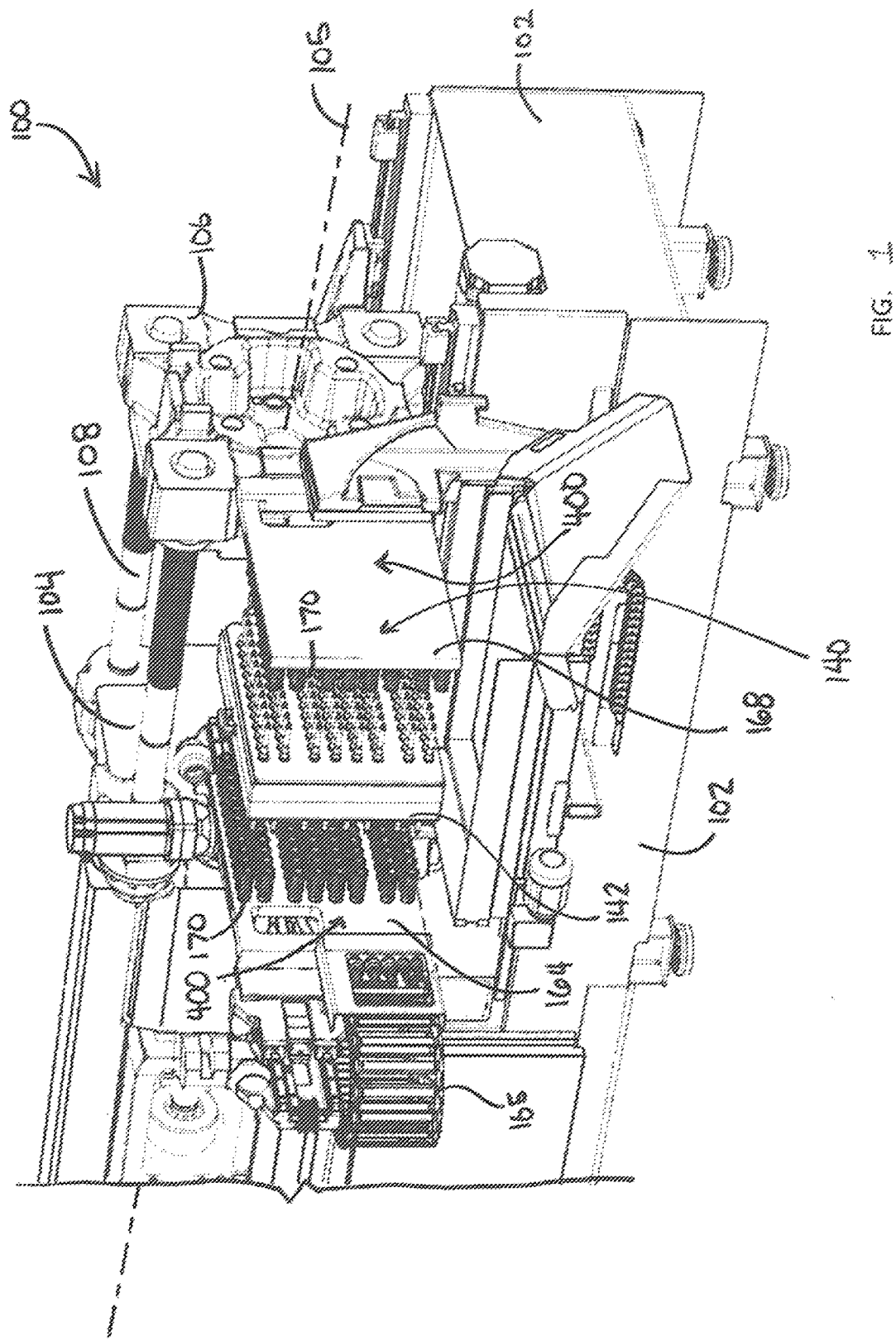
FIG. 1 is a perspective view of the non-operator side of a portion of an injection molding machine.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

When operating an injection molding machine, it is often desirable to have as low a cycle time as possible. One factor affecting cycle time is the time it takes for the melt injected into mold cavities to cool sufficiently so that molded articles may be ejected from the machine (e.g. onto a conveyor) without suffering distortion or damage. Some articles, for example PET preforms, can require significant cooling time. In some cases, this cooling time can be two, three, or more times the time it takes to form the article in the mold.

The cycle time of the machine can be reduced by cooling articles outside of the mold. For example, the articles can be moved from the mold in a not-yet-solidified state to a post-mold cooling apparatus where the articles are cooled prior to ejecting the articles from the machine. A post-mold cooling apparatus may include a cooling plate assembly having cooling tubes (often a multiple of two or three times the number of mold cavities) mounted to a cooling plate. The cooling plate is typically provided with internal cooling channels for conducting cooling fluid. However, the inventors have found that it can be difficult to achieve uniform, balanced cooling across the entire plate (and hence across all the tubes). For example, the portion of the cooling plate (and the tubes mounted thereto) that is furthest from the cooling channel inlet(s) can be significantly warmer than the portion of the plate nearest the inlets. This uneven cooling can cause quality problems and/or can increase overall cycle time, since the length of time required for sufficient cooling will be dictated by the warmest preform (loaded in the warmest tube). Furthermore, in existing cooling plate designs, each cooling tube is typically connected to a supply channel in parallel flow with at least one other tube, and often in parallel with every other tube.

As described in further detail below, according to some aspects of the teaching disclosed herein, a cooling plate assembly is provided in which the cooling tubes are arranged in groups of tubes (e.g. four or more groups with 8 or more tubes per group). The tubes in each group are connected in series flow, and the groups are connected in parallel. In some examples, this can help balance the cooling flow across all the tubes, because water flow to each tube in a group of tubes will be equal—the flow out of an upstream tube equals the flow into the next downstream tube.

In some examples, the teaching disclosed herein can simplify construction of the cooling plate assembly by requiring fewer drilled flow channels in the cooling plate. In some examples, the volume of water required for the cooling plate and the line sizes for fluid supply headers in the plate can be reduced, because fewer tubes receive fluid directly from the headers. In some examples, satisfactory flow may be achieved without the need for booster pumps.

Referring to FIG. 1, an example injection molding machine 100 includes a base 102, with a stationary platen 104 and a moving platen 106 mounted to the base 102 and coupled together via tie bars 108. The moving platen 106 can translate towards and away from the stationary platen 104 along a machine axis 105. A mold can be formed between the platens 104, 106, the mold defined at least in part by a first mold half mountable to the stationary platen 104, and a second mold half mountable to the moving platen 106. An injection unit is mounted to the base 102 for injecting resin or other mold material into the mold to form a molded article.

Figure 2A:
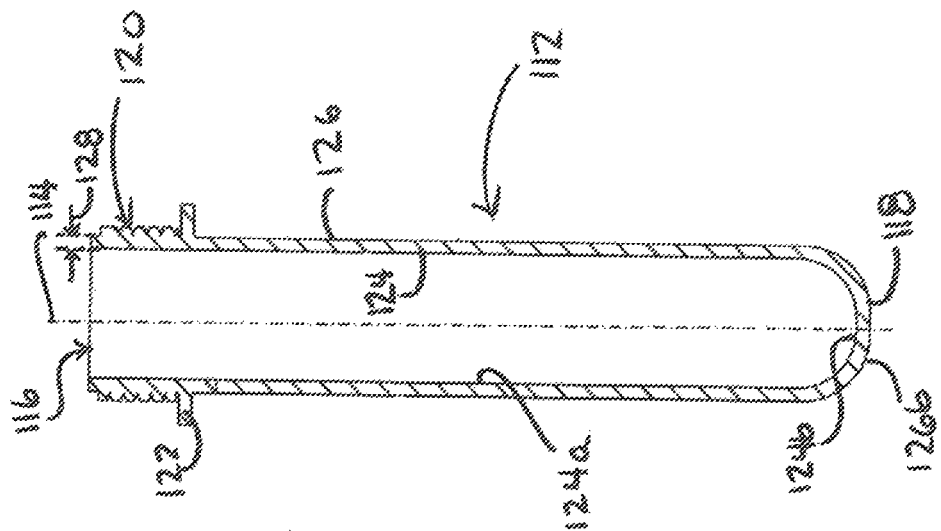
FIG. 2A is a side view of an example injection molded article formed by the injection molding machine of FIG. 1.
Figure 2B:
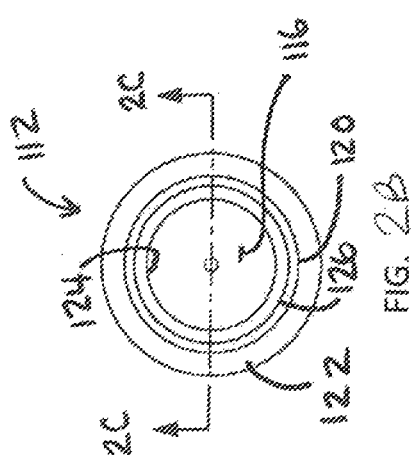
FIG. 2B is a front view of the injection molded article of FIG. 2A.
Figure 2C:
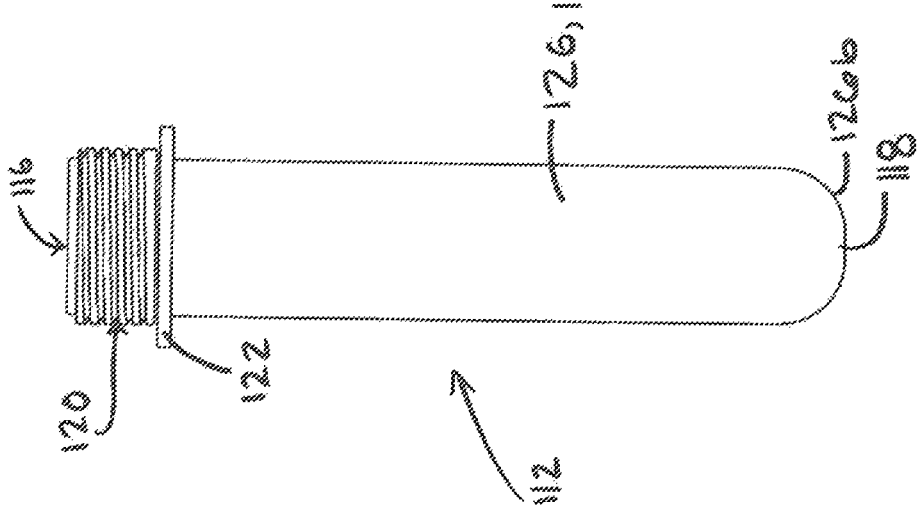
FIG. 2C is a cross-sectional view of the injection molded article of FIG. 2A taken along line 2C-2C in FIG. 2B.
Figure 7B:
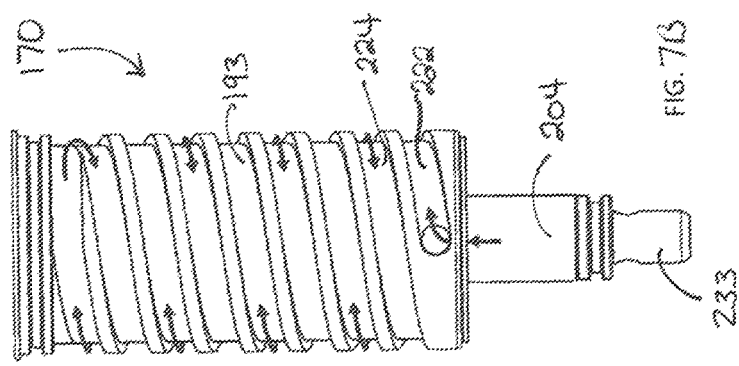
FIG. 7B is a top view of the portions of the cooling tube of FIG. 7A.
Figure 7A:
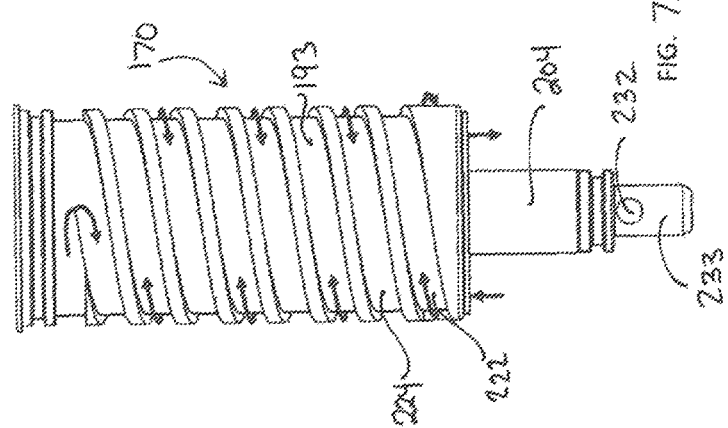
FIG. 7A is a side view of portions of a cooling tube of the cooling plate assembly of FIG. 3.
Figure 7C:
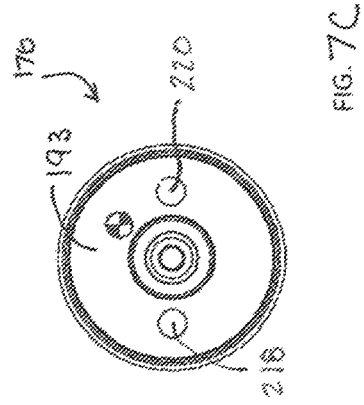
FIG. 7C is a rear view of the portions of the cooling tube of FIG. 7A.

In the example illustrated, the injection molding machine 100 is set up for molding articles 112 (also referred to as preforms 112) that can be used as input material for subsequent processing, for example a blow molding operation to produce beverage containers. With reference to FIG. 2, an example preform 112 includes a generally elongate tubular article extending along a preform axis 114, and having opposing open and closed ends 116, 118, respectively. A threaded portion 120 for receiving a closure is provided adjacent the open end 116. A radially outwardly extending annular flange 122 is disposed adjacent the threaded portion 120, with the threaded portion 120 disposed axially between the open end 116 and the flange 122. The preforms 112 have an inner surface 124 that includes a generally cylindrical inner wall portion 124a along the axial extent of the preform 112 (between the open and closed ends 116, 118), and a generally concave inner end portion 124b at the closed end 118. The preforms 112 have an outer surface 126 spaced apart from the inner surface 124. The outer surface 126 includes a generally cylindrical outer wall portion 126a along the axial extent of the preform 112 and a convex outer end portion 126b at the closed end 118. The spacing between the inner and outer surfaces 124, 126, respectively, generally defines a preform wall thickness 128.

With reference again to FIG. 1, in the example illustrated, the first mold half (mountable to the stationary platen 104) includes a cavity side of the mold and has recesses for forming the outer surface 126 of the preforms 112. The second mold half (mountable to the moving platen 106) includes a core side of the mold and has mold core pins for insertion into the mold cavities and forming the inner surface 124 of the preforms 112. The machine 100 can have an equal quantity of mold cavities and mold pins. This quantity defines the cavitation number of the mold.

In the example illustrated, the injection molding machine 100 is provided with a part-handling apparatus 140 for moving and/or treating injection molded articles formed in the mold of the machine. In FIG. 1, the part handling apparatus 140 is configured to operate with a mold having a cavitation number of 32. The part-handling apparatus 140 includes a take-out plate 164, a rotary transfer shell 142, and an optional supplemental cooling device 168. The take-out plate 164 and the supplemental cooling device 168 each include a cooling plate assembly. An example cooling plate assembly 400 for use with the take-out plate 164 is described in further detail below with reference to FIGS. 3 to 6. The cooling plate assembly 400 may also be used with the supplemental cooling device 168. The rotary transfer shell 142 is described in PCT Publication No. WO2013134874 (Schad et al.).

In the example illustrated, the take-out plate 164 is movable between the mold and the rotary transfer shell 142 for transferring articles from the mold to the rotary transfer shell 142. The take-out plate 164 generally transfers articles from the mold to a position outside the mold for engagement by pins of the rotary transfer shell 142.

In the example illustrated, the take-out plate 164 is carried by a robot 165 that can translate the take-out plate 164 along a first robot axis (z-axis) between at least one advanced position and at least one retracted position. When in the advanced position, the take-out plate 164 is disposed between the first and second mold halves. When in the retracted position, the take-out plate 164 is clear of the mold. Furthermore, the take-out plate 164 is, in the example illustrated, translatable along a second robot axis (x-axis) that is parallel to the machine axis 105.

The optional supplemental cooling device 168 is, in the example illustrated, moveable relative to the rotary transfer shell 142 between an engaged position and a disengaged position. In the engaged position, the supplemental cooling device 168 and the rotary transfer shell 142 are drawn together. In the disengaged position, the supplemental cooling device 168 is spaced apart from the rotary transfer shell 142. In the example illustrated, the supplemental cooling device 168 is moved between the engaged and disengaged positions by translation along an axis (x-axis) parallel to the machine axis 105.

In use, a first set of molded articles 112 is produced in a first injection cycle. Once the first set of articles 112 has partially cooled enough to allow removal from the mold without damaging or distorting the shape of the articles 112, the mold is opened, and the articles 112 are transferred from the mold to retained engagement on the take-out plate 164. Once the first set of articles 112 is loaded onto the take-out plate 164, the take-out plate 164 shuttles out of the mold area (i.e. along the z-axis to the retracted position) so that the mold can reclose to produce a subsequent, second set of articles 112 in the mold.

Outside the mold, the take-out plate 164 and the rotary transfer shell 142 are drawn together, and the first set of articles 112 is released from retained engagement on the take-out plate 164 and transferred to retained engagement on the rotary transfer shell 142. After transferring the first set of articles 112 to the rotary transfer shell 142, the take-out plate 164 can retract from the rotary transfer shell 142 (i.e. along the x-axis), and the rotary transfer shell 142 can rotate 180 degrees to move the first set of articles 112 to face the supplemental cooling device 168.

The supplemental cooling device 168 and the rotary transfer shell 142 are drawn together, and the first set of articles 112 is then released from the rotary transfer shell 142 and transferred to retained engagement on the supplemental cooling device 168. The first set of articles 112 can, before the supplemental cooling device 168 disengages the rotary transfer shell 142, be transferred back to the rotary transfer shell 142. The rotary transfer shell 142 may then rotate to an unload position, and drop the first set of articles 112.

Referring to FIG. 3, in the example illustrated, the cooling plate assembly 400 includes a cooling plate 172, and a plurality of cooling tubes 170 mounted to the cooling plate 172 for receiving and cooling a plurality of injection molded articles. In FIG. 3, only a single cooling tube 170 is shown assembled to plate 172. In FIG. 4, the cooling tubes 170 are represented schematically by circles. In the example shown, the cooling plate assembly 400 is configured for use with a mold having a cavitation number of 72, and includes 72 cooling tubes 170. Such a configuration corresponds to a "single set" of cooling tubes, in which all of the tubes 170 are emptied and refilled with articles produced in a subsequent cycle of the injection molding machine 100. Having only a single set of cooling tubes on the take-out plate can help reduce the weight of the take-out plate, which can help increase the speed of the take-out plate as it shuttles into and out of the mold area. In other examples, the take-out plate may have multiple sets of cooling tubes (such as, for example, two, three, or four sets of tubes). Such a configuration can increase the residency of the molded articles within the cooling tubes of the take-out plate, but can reduce the speed of the take-out plate, and increase the complexity and cost.

In the example illustrated, the cooling plate 172 includes a plate body 174 which has a cooling fluid conduit system 176 and an air conduit system 178 therein. The cooling fluid conduit system 176 provides cooling fluid to the cooling tubes 170, to facilitate heat transfer from the articles 112. The air conduit system 178 provides air flow communication with the cooling tubes 170, which can also facilitate heat transfer from the injection molded articles 112 and/or can facilitate transfer of the injection molded articles 112 to and from the cooling plate assembly 400, as will be described in further detail below.

In the example shown, the cooling fluid conduit system 176 and air conduit system 178 are formed by drilling into the plate body 174 to form bores. Various ends of the bores are plugged in order to direct cooling fluid and air flow in a desired direction, and end plugs are indicated by cross-hatching in FIG. 3, for example as indicated at end plug 179.

Referring to FIGS. 3 to 4, in the example shown, the cooling tubes 170 are arranged in a plurality of groups of cooling tubes, namely a first group 180a of cooling tubes 170 through a sixth group 180f of cooling tubes 170. Each group includes 12 cooling tubes 170 (i.e. a first cooling tube 170, a second cooling tube 170, a third cooling tube 170, and so on). The cooling tubes 170 are arranged in 2 columns, where one column includes 5 cooling tubes 170 and one column includes 7 cooling tubes 170.

In the example illustrated, the cooling fluid conduit system 176 includes a cooling fluid inlet 177, a supply header 181, first 186a through sixth 186f cooling fluid lines, an evacuation header 185, and a cooling fluid outlet 187. Each cooling fluid line 186a-186f has an inlet end 188 connected to the supply header 181 and an outlet end 190 connected to the evacuation header 185. Each cooling fluid line 186a-186f is generally U-shaped, and includes two legs extending perpendicular to the supply header 181 and a connector oriented parallel to the supply header 181 and connecting together the two legs.

In the example illustrated, the connectors of the first, third, and fifth fluid lines 186a, 186c, and 186e are formed by drilling a connector bore 183 into the plate body 174. The connector bore 183 intersects the legs of each of the first, third, and fifth fluid lines 186a, 186c, and 186e. Connector plugs 189 are inserted into the connector bore 183 to block fluid flow through the connector bore 183 among the first, third, and fifth fluid lines 186a, 186c, and 186e. The connectors of the second, fourth, and sixth fluid lines 186b, 186d, and 186f are formed in a similar manner.

In the example shown, the cooling tubes 170 within a given group are connected to the cooling fluid line of that group in series. For example, the cooling tubes 170 of the first group 180a of cooling tubes are connected to the first cooling fluid line 186a in series, so that for cooling fluid to reach any given cooling tube 170 in the first group 180a, the cooling fluid first passes through any cooling tubes 170 upstream of the given cooling tube 170. Similarly, the cooling tubes 170 of the second group 180b of cooling tubes are connected to the second cooling fluid line 186b in series, so that for cooling fluid to reach any given cooling tube 170 in the second group 180b, the cooling fluid first passes through any cooling tubes 170 upstream of the given cooling tube 170.

Referring to FIGS. 3 and 5, in the example illustrated, the air conduit system 178 includes an air supply header 192, and a plurality of air lines connected to the air supply header 192. In the example shown, the air conduit system 178 includes 12 air lines 194a to 194l, and each group 180 of cooling tubes 170 is supplied with air by two of the air lines, one air line per leg. For example, the first group 180a of first tubes 170 is supplied with air by air line 194a and air line 194b. Air enters each air line 194 at a first end thereof from the air supply header 192, and exits the air line 194 via the cooling tubes 170. The end of each air line opposed to the first end is plugged and closed.

Referring to FIG. 6B, in the example shown, the cooling fluid lines and the air lines are stacked and overlie each other, in a direction parallel to a thickness of the plate 172. For example, the first leg of the first cooling fluid line 186a is stacked with and overlies the first 194a air line, and the second leg of the first cooling fluid line 186a is stacked with and overlies the second 194b air line. Similarly, the second cooling fluid line 186b is stacked with and overlies the third 194c and fourth 194d air lines.

Referring now to FIGS. 6A to 7C, the cooling tubes 170 and their connection to the cooling plate 172 is shown in greater detail. In these figures, a single cooling tube 170 and its connection to the first cooling fluid line 186a and the first air line 194a is shown. The remaining cooling tubes and their connection to the respective cooling fluid lines and respective air lines may be identical or similar to the configuration in FIGS. 6A to 7C, and for simplicity, is not described in detail herein.

In the example illustrated, the cooling plate 172 has a front face 191 and an opposed rear face 234. The cooling tubes 170 project from the front face 191. Each cooling tube 170 has a tube body 193 that defines an interior nest 195 for accommodating a preform 112. The nest 195 has an open outer end 196 and a generally closed bottom end 198. The nest 195 can be configured to generally match the outer profile of the preform 112 received therein, with at least portions of the outer surface of the preform that are targeted for cooling bearing against the inner surface of the cooling tube 170. In the example illustrated, the closed bottom end 198 of the nest 195 is configured to engage the convex outer end portion 126b of the preform 112.

In the example shown, the cooling plate 172 includes a plurality of sockets 202 extending inwardly from the front face 191 thereof, and each cooling tube 170 includes a spigot 204 extending outwardly from the tube body 193. Each spigot 204 is received in a respective one of the sockets 202, to mount the cooling tube 170 to the cooling plate 172. The sockets 202 are arranged in a plurality of groups, corresponding to the groups of cooling tubes 170. For example, the first group 180a of cooling tubes 170 is mounted to a first group of sockets 202, and each spigot 204 of the first group 180a of cooling tubes 170 is received in a respective one of the sockets 202 of the first group of sockets. The second group 180b of cooling tubes 170 is mounted to the second group of sockets 202, and each spigot 204 of the second group of cooling tubes 170 is received in a respective one of the sockets 202 of the second group of sockets.

Referring still to FIGS. 6A to 6C, in the example illustrated, the socket 202 extends between the first air line 194a and the front face 191 of the cooling plate 172. Particularly, the socket 202 extends inwardly from the front face 191 of the cooling plate 172, through the first cooling fluid line 186a, and to the first air line 194a, so that the socket 202 provides a flow passage (also referred to as a crossflow passage) between the cooling fluid conduit system 176 and the air conduit system 178. As will be described below, the flow passage is blockable, and in use, is blocked by the spigot 204.

Referring still to FIGS. 6A to 6C, in the example illustrated, the socket 202 is a generally cylindrical bore having a socket diameter 206, and the first cooling fluid line 186a has a cooling fluid line diameter 208. In the example shown, the socket diameter 206 is greater than the cooling fluid line diameter 208. Furthermore, the socket 202 has a socket centerline 210, and the first cooling fluid line 186a has a cooling fluid line centerline 212 that intersects the socket centerline 210. In the example illustrated, the socket centerline 210 extends generally perpendicular to the front face 191 of the cooling plate 172, and the cooling fluid line centerline 212 extends generally parallel to the front face 191 of the cooling plate 172.

Referring still to FIGS. 6A to 6C, the socket 202 has a socket depth 214 that extends between the front face 191 and a juncture of the socket 202 and the first air line 194a. Furthermore, the first cooling fluid line 186a is spaced from the front face 191 by a cooling fluid line spacing 216. The spacing 216 represents the minimum wall thickness between the cooling fluid line 186a and the front face 191. The socket depth 214 is greater than a sum of the cooling fluid line spacing 216 and the cooling fluid line diameter 208.

Referring still to FIGS. 6A to 6C, in use, the spigot 204 plugs and blocks the flow passage between the first air line 194a and the first cooling fluid line 186a to impede fluid communication between the first air line 194a and the first cooling fluid line 186a. This can impede the cooling fluid from entering the air conduit system 178. Furthermore, the spigot 204 blocks the first cooling fluid line 186a. This can impede the cooling fluid from flowing across the socket 202 within the fluid line 186a.

In the example illustrated, the cooling tube 170 includes a cooling tube conduit extending between a cooling tube fluid inlet 218 and a cooling tube fluid outlet 220. In use, the cooling tube fluid inlet 218 is connected to the first cooling fluid line 186a upstream of the spigot 204 via, in the example illustrated, a first orifice 219 in the cooling plate 172. The cooling tube fluid outlet 220 is connected to the first cooling fluid line 186a downstream of the spigot 204 via, in the example illustrated, a second orifice 221 in the cooling plate 172. Cooling fluid flowing in the fluid line 186a upstream of the spigot 204 is blocked from flowing directly across the socket to the fluid line downstream of the spigot, and is instead directed to flow into the tube conduit via the cooling tube fluid inlet 218. After flowing through the fluid conduit in the cooling tube 170 the fluid flow returns to the fluid line 186a downstream of the spigot via the cooling tube fluid outlet 220.

Referring still to FIGS. 6A to 7C, in the example illustrated, the tube conduit extends between the cooling tube fluid inlet 218 and outlet 220 and along the sidewalls of the tube 170. Cooling fluid can flow in the tube conduit to help transfer heat away from the tube body 193. In the example illustrated the tube conduit extends helically along the sidewalls of the tube body 193. The tube body 193 has an outer surface that has two helical grooves 222, 224 formed therein. A jacket 227 (shown in FIGS. 6A and 6B) is received over the tube body 193 and covers the helical grooves 222, 224, to form two helical flow channels 226, 228. The tube conduit comprises the two helical flow channels 226, 228 in the example illustrated. The first helical flow channel 226 is in fluid communication with the cooling tube fluid inlet 218, and receives fluid therefrom and directs it helically and upwardly along the cooling tube. The second helical flow channel 228 is in fluid communication with the first helical flow channel 226, and fluid from the first helical channel is directed helically and downwardly along the second helical channel of the cooling tube, and to the cooling tube fluid outlet 220.

In the example illustrated, the flow of the cooling fluid through the tube conduit of the cooling tube 170 cools the cooling tube 170 and can facilitate cooling the preform in the tube 170. By blocking the first cooling fluid line 186a with the spigot 204, the cooling fluid in the cooling fluid line 186a upstream of the spigot 204 is directed into the cooling tube fluid inlet 218 and through the tube conduit. For each group 180, the cooling fluid entering the inlet end 188 of the cooling fluid line 186 is directed to pass sequentially through the tubes 170 (twelve tubes in the example illustrated). Upon exiting the tube outlet 220 of the last tube 170 in a group 180, the cooling fluid is directed to the evacuation header 185 via the outlet end 190 of the cooling fluid line 186. The cooling fluid may generally not bypass any given cooling tube 170. This may facilitate providing generally equal flow through the cooling tubes 170 in any group 180, which can help provide more uniform cooling. The series fluid flow may also increase turbulence of the fluid flow, which can further increase the rate of heat transfer away from the tubes 170 and the plate 172.

Referring still to FIGS. 6A to 7C, in the example illustrated, the spigot 204 is disposed in an upper portion of the socket (nearer the front face 191 of the cooling plate 172). A lower portion of the socket (nearer the rear face 234 of the cooling plate 172) is in communication with the air line 194. The cooling tube 170 includes an axial projection 231 extending from the spigot and into the lower portion of the socket. The axial projection 231 has a projection diameter that is less than the diameter of the socket (the socket diameter 206). The tube 170 has an axial bore 230 open to the bottom end 198 of the nest 195 and extending through the spigot 204. A transverse bore 232 extends through the axial projection 231 and intersects the axial bore 230. Air flow communication is provided between the air line 194 and the nest 195 via the axial bore 230, the transverse bore 232, and the space between the outer surface of the projection 231 and the inner surface of the socket 202.

In use, negative air pressure can be provided in the air conduit system 178 to draw air from the nest 195 towards the air line 194 via the spigot 204. This can provide a suction force on the preform 112 to help draw the preform into the nest 195 during transfer of the preform 112 to the tube 170, and to help retain a transferred preform 112 in the tube 170. Alternately or additionally, positive air pressure can be provided to the air conduit system 178, for conducting air from the first air line 194a to the nest 195 via the spigot 204. This can provide a pushing force on a seated preform 112 to assist ejection of the preform 112 from the tube 170.

Referring still to FIGS. 6A and 6B, in the example shown, the cooling tube 170 is secured to the cooling plate 172 with a fastener 236. In the example illustrated, the fastener 236 passes through the rear face 234 of the cooling plate 172, through the first air line 194a, and into a fastener bore in the axial projection 231 of the cooling tube 170. In the example illustrated, the lowermost portion of the axial bore 230 comprises the fastener bore. The fastener bore extends through the axial projection 231 of the cooling tube 170 and is open to a lower endface of the axial projection 231.

Referring still to FIGS. 6A and 6B, the cooling plate assembly 400 may include various seals to impede leakage of fluid. In the example shown, the cooling tube 170 includes a first seat 238 provided on a radially outer surface of the spigot 204. In the example illustrated, the first seat 238 is axially intermediate the first cooling fluid line 186a and the first air line 194a. A first O-ring is seated in the first seat 238 to seal the interface between the outer diameter of the spigot 204 and the socket diameter 206 and impede leakage of fluid between the first cooling fluid line 186a and the first air line 194a. In the example illustrated, the cooling tube 170 includes a second seat 240 provided on an underside surface of the tube body 193 and radially outward of the cooling tube fluid inlet 218 and the cooling tube fluid outlet 220. A second O-ring is seated in the seat 240 to seal the interface between the front face 191 of the cooling plate 172 and the tube body 193 and impede leakage of cooling fluid out from the cooling assembly 400.

In use, once the preforms 112 have partially cooled enough to allow removal from the mold, the mold is opened, and the take-out plate 164 translates into the advanced position between the mold halves. To assist removal of the preforms 112 from the mold, a suction source provides negative air pressure in the air conduit system 178. Air is drawn from the nests 195 toward the air conduit system 178 to create a suction force in the nests 195. The suction force can help draw the preforms 112 from the mold into respective nests 195.

In the example illustrated, once the preforms 112 are seated within the nests 195 of the cooling tubes 170, the suction source can continue to provide negative air pressure to retain the preforms 112 in the tubes 170. When the preforms 112 are seated, the exterior surfaces of the preforms 112 are conductively cooled through contact with inner surfaces of the nests 195 of the cooling tubes 170, and thermal energy in the preform 112 is transferred to the coolant fluid flowing through the tube body 193.

In the example illustrated, the pins of the rotary transfer shell 142 enter the preforms 112 retained in the respective cooling tubes 170 and, in the example illustrated, provide convective cooling to the interior surfaces of the preforms 112. The convective cooling is, in the example illustrated, provided by a suction air stream drawing air into the open end of the preforms 112, through the intermediate space between the pins and the inner surfaces of the preforms 112, and into the pins. In the example illustrated, the suction force holding the preform 112 in the tube 170 is greater than the suction force generated in the intermediate space by the pin's suction air stream, so the preform 112 remains in retained engagement in the tube 170.

In the example illustrated, after the preform 112 has been held in the cooling tube 170 for a desired period of time, the preform 112 is ejected from the cooling tube 170 and, in the example illustrated, moved to the transfer shell 142. To assist ejection of the preform 112 from the cooling tube 170, the negative air pressure in the air conduit system 178 is replaced with a supply of pressurized air. The pressurized air is supplied to the air line 194 to urge the preforms 112 out of respective cooling tubes 170, and the suction force provided by the pin's suction air stream can pull the preforms 112 into retained engagement on the pins.

In the example illustrated, once the preforms 112 have been transferred from the tubes 170 of the take-out plate 164 to the pins of the transfer shell 142, the transfer shell 142 can rotate and present the preforms 112 for transfer to the cooling tubes 170 of the cooling plate assembly 400 of the supplemental cooling device 168. The supplemental cooling device 168 can be advanced towards the transfer shell 142, with the tubes 170 receiving the preforms 112 held on the shell 142.

In the example illustrated, prior to part transfer, a slight gap is provided between outer surfaces of the preforms 112 retained on the rotary transfer shell 142 and the inner surfaces of the nests 195 of the cooling tubes 170.

In the example illustrated, a suction source provides negative air pressure in the air conduit system 178 of the supplemental cooling device 168 to assist transfer of the preforms 112 from the pins. Air is drawn from the nest 195 toward the air conduit system 178 of the supplemental cooling device 168 to create a suction force in the nests 195 and help draw the preforms 112 from the pins into respective nests 195. The suction force in the nests 195 is greater than the suction force provided by the pin's air stream, and the preforms 112 are pulled axially off the pins and seated within the nests 195 of the cooling tubes 170 of the supplemental cooling device 168. Once the preforms 112 are seated, the cooling tubes 170 of the supplemental cooling device 168 provide conductive cooling to the exterior surfaces of the preforms 112 (similar to the conductive cooling provided by the cooling tubes 170 of the take-out plate 164).

In the example of FIGS. 6A to 7C, the cooling plate 172 includes first 219 and second 221 orifices, which are separate from the socket 202, for providing cooling fluid to the cooling tube fluid inlet 218 and receiving cooling fluid from the cooling tube fluid outlet 220, respectively. Referring to FIG. 8A, a portion of an alternative cooling plate assembly including a cooling tube 870 mounted to a cooling plate 872 is shown. The cooling tube 870 and the cooling plate 872 have similarities to the cooling tube 170 and the cooling plate 172, and like features are identified by like reference characters, incremented by 700. In the example of FIG. 8A, cooling fluid is conducted from the upstream side of the fluid line 886 to the cooling tube fluid inlet 918, and from the cooling tube fluid outlet 920 to the downstream side of the fluid line 886, through the socket 902. In the example illustrated a first notch 940 is provided in the sidewall of the spigot 904 facing the upstream side of the fluid line 886, and a second notch 942 is provided in the sidewall of the spigot 904 facing the downstream side of the fluid line 886. The first notch 940 provides fluid communication between the upstream side of the fluid line 886 and the cooling tube fluid inlet 918, and the second notch 942 provides fluid communication between the cooling tube fluid outlet 920 and the downstream side of the fluid line 886.

Operation of a part-handling apparatus in single and multiple stages is described in detail in PCT Publication No. WO2013134874 (Schad et al.). In the example of FIGS. 3 to 5, the cooling plate assembly 400 has 72 cooling tubes and is configured for single stage operation. In alternative examples, cooling plates may have another number of cooling tubes, and/or may be configured for multiple stage operation.

Figure 9:
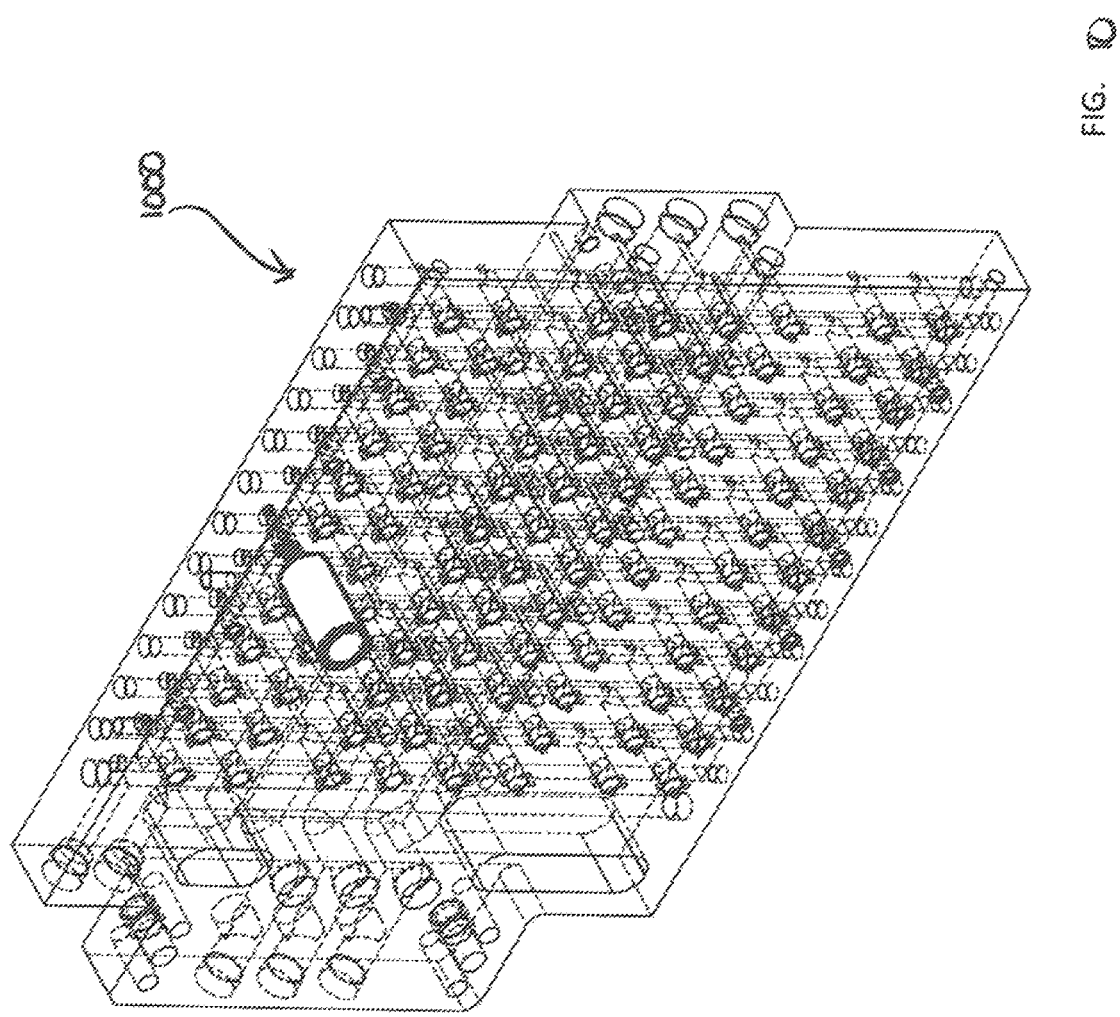
FIG. 9 is a front view of an alternative cooling plate assembly for an injection molding machine like that of FIG. 1.

Referring to FIGS. 9 and 10, an alternative cooling plate assembly 1000 configured to include 96 cooling tubes is shown. In the example illustrated, the cooling plate assembly 1000 is configured for use with a 32-cavity mold and to include 3 sets of cooling tubes, with each set including 32 cooling tubes. The sets of tubes can be loaded with corresponding sets of preforms produced in sequential cycles of the injection molding machine. The tubes in a group of tubes connected in series fluid flow may belong to a single set of tubes (from one injection cycle) or belong to more than one set. In the example illustrated, the tubes in one leg of the U-shaped configuration of tubes in a group receive preforms from one injection cycle, and the tubes in the second leg receive preforms from another cycle.

Referring to FIGS. 11 and 12, an alternative cooling plate assembly 1100 configured for 216 cooling tubes is shown. In the example illustrated, the cooling plate assembly 1100 is configured for use with a 72-cavity mold and to include 3 sets of cooling tubes, with each set including 72 cooling tubes. The 72 cooling tubes in each set are spaced apart in a matrix pattern that matches the matrix pattern of the 72 mold cores of the mold. In the cooling assemblies 1000 and 1100, each set of cooling tubes has a separate air supply header (i.e. air supply headers 1092a, 1092b, and 1092c in the cooling plate assembly 1000, and air supply headers 1192a, 1192b, and 1192c in the cooling plate assembly 1100). This can allow for separate control of pressure or suction to each set of tubes. A set of preforms loaded into a set of tubes remains in the tubes for two more injection cycles. After that, the set of preforms is transferred to the transfer shell, and a new set of preforms is transferred from the mold to the just-emptied cooling tubes.

While the above description provides examples of one or more processes or apparatuses, it will be appreciated that other processes or apparatuses may be within the scope of the accompanying claims.

The invention claimed is:

1. A cooling plate assembly for an injection molding machine, comprising:
   a) a cooling plate;
   b) a cooling fluid conduit system in the cooling plate, the cooling fluid conduit system comprising a supply header, an evacuation header, and first and second cooling fluid lines, each cooling fluid line having a respective inlet end connected to the supply header and a respective outlet end connected to the evacuation header, the first and second cooling lines isolated from each other between the respective inlet ends and outlet ends; and
   c) a plurality of cooling tubes mounted to the cooling plate for receiving and cooling a plurality of injection molded articles, the cooling tubes arranged in at least a first group of first cooling tubes and a second group of second cooling tubes, the first cooling tubes connected to the first cooling fluid line in series and the second cooling tubes connected to the second cooling fluid line in series.

2. The assembly of claim 1, wherein the cooling plate comprises a plurality of sockets, and the cooling tubes each comprise a spigot received in a respective one of the sockets.

3. The assembly of claim 2, wherein the sockets are arranged in at least a first group of first sockets and a second group of second sockets, and wherein each spigot of the first cooling tubes is received in a respective one of the first sockets, and each spigot of the second cooling tubes is received in a respective one of the second sockets.

4. The assembly of claim 3, wherein the first sockets are in fluid communication with the first cooling fluid line, and the second sockets are in fluid communication with the second cooling fluid line.

5. The assembly of claim 4, wherein each cooling tube comprises a cooling tube conduit adjacent a molded-article-receiving nest of the cooling tube, the cooling tube conduit extending in fluid communication between a cooling tube fluid inlet connected to the cooling fluid conduit system and a cooling tube fluid outlet connected to the cooling fluid conduit system.

6. The assembly of claim 5, wherein each spigot of the first cooling tubes blocks the first cooling fluid line at the respective one of the first sockets, and wherein each cooling tube fluid inlet of the first cooling tubes is connected to the first cooling fluid line upstream of the respective one of the first sockets, and each cooling tube fluid outlet of the first cooling tubes is connected to the first cooling fluid line downstream of the respective one of the first sockets.

7. The assembly of claim 6, wherein each spigot of the second cooling tubes blocks the second cooling fluid line at the respective one of the second sockets, and wherein each cooling tube fluid inlet of the second cooling tubes is connected to the second cooling fluid line upstream of the respective one of the second sockets, and each cooling tube fluid outlet of the second cooling tubes is connected to the second cooling fluid line downstream of the respective one of the second sockets.

8. The assembly of claim 2, further comprising an air conduit system in the cooling plate and in fluid communication with each socket, each spigot blocking a portion of each socket to impede fluid flow between the air conduit system and the cooling fluid conduit system.

9. The assembly of claim 8, wherein each spigot comprises at least one bore extending therethrough and providing fluid communication between the air conduit system and a molded-article-receiving nest of a respective one of the cooling tubes.

10. The assembly of claim 8, wherein the cooling plate has a thickness and the air conduit system comprises at least a first air line, and wherein the first cooling fluid line and the first air line are stacked and overlie each other in a direction parallel to the thickness.

11. A cooling plate assembly for an injection molding machine, comprising:
    a) a cooling plate having a front face, a rear face spaced from the front face, and a plate thickness extending between the front face and the rear face;
    b) a cooling fluid conduit system extending within the plate thickness of the cooling plate, the cooling fluid conduit system comprising a cooling fluid inlet, a cooling fluid outlet, and at least a first cooling fluid line in fluid communication with the cooling fluid inlet and the cooling fluid outlet;
    c) a socket open to the front face and extending at least partially through the plate thickness, the socket intersecting the first cooling fluid line intermediate the cooling fluid inlet and the cooling fluid outlet; and
    d) at least a first cooling tube mounted to the cooling plate, the first cooling tube comprising a molded-article-receiving nest for receiving and cooling an injection molded article, a spigot received in the socket and blocking the first cooling fluid line, and a cooling tube conduit adjacent the molded-article-receiving nest, the cooling tube conduit extending in fluid communication between a cooling tube fluid inlet connected to the first cooling fluid line upstream of the socket, and a cooling tube fluid outlet connected to the first cooling fluid line downstream of the socket.

12. The assembly of claim 11, further comprising a second cooling tube mounted to the cooling plate, wherein the first cooling tube and the second cooling tube are connected to the first cooling fluid line in series.

13. The assembly of claim 11, further comprising an air conduit system extending within the plate thickness of the cooling plate, the socket providing a flow passage between the cooling fluid conduit system and the air conduit system, and wherein the spigot blocks the flow passage to impede fluid flow between the air conduit system and the cooling fluid conduit system.

14. The assembly of claim 13, wherein the spigot comprises at least one bore extending therethrough and providing fluid communication between the air conduit system and the molded-article-receiving nest of the first cooling tube.

15. The assembly of claim 14, wherein the air conduit system comprises at least a first air conduit line, and wherein the first cooling fluid line and the first air conduit line are stacked and overlie each other in a direction parallel to the plate thickness.

16. A cooling plate for an injection molding machine, the cooling plate comprising:
    a) a plate body for supporting a plurality of cooling tubes;
    b) a cooling fluid conduit system in the plate body for cooling the cooling tubes;
    c) an air conduit system in the plate body for providing air flow communication with respective molded-article-receiving nests of the cooling tubes; and
    d) a plurality of sockets in the plate body for receiving respective spigots of the cooling tubes, each socket providing a flow passage between the cooling fluid conduit system and the air conduit system, each flow passage blockable by a respective spigot to impede fluid flow between the cooling fluid conduit system and the air conduit system.

17. The cooling plate of claim 16, wherein the cooling fluid conduit system comprises at least a first cooling fluid line, and the air conduit system comprises at least a first air line, and the flow passages are provided between the first air line and the first fluid line.

18. The cooling plate of claim 17, wherein the plate body has a plate thickness, and the first cooling fluid line and the first air line are stacked and overlie each other in a direction parallel to the thickness.

19. The cooling plate of claim 18, wherein the plate body comprises a front face, the first cooling fluid line extending within the plate thickness at a position between the first air line and the front face, and wherein each of the sockets extends from the front face through the first cooling fluid line and to the first air line.

20. The cooling plate of claim 19, wherein the first cooling fluid line has a first cooling fluid line diameter and a first cooling fluid line centreline extending generally parallel to the front face, and wherein each socket has a socket diameter greater than the first cooling fluid line diameter, and a socket centreline extending generally perpendicular to the front face and intersecting the first cooling fluid line.

* * * * *